United States Patent
Maude

(10) Patent No.: US 7,223,373 B2
(45) Date of Patent: *May 29, 2007

(54) CATALYTIC REACTOR

(75) Inventor: Jason Andrew Maude, Cheadle (GB)

(73) Assignee: Compactgtl PLC, London (GB)

( * ) Notice: Subject to any disclaimer, the term of this patent is extended or adjusted under 35 U.S.C. 154(b) by 104 days.

This patent is subject to a terminal disclaimer.

(21) Appl. No.: 10/491,779

(22) PCT Filed: Sep. 23, 2002

(86) PCT No.: PCT/GB02/04312

§ 371 (c)(1),
(2), (4) Date: Apr. 6, 2004

(87) PCT Pub. No.: WO03/033133

PCT Pub. Date: Apr. 24, 2003

(65) Prior Publication Data

US 2004/0251001 A1    Dec. 16, 2004

(30) Foreign Application Priority Data

Oct. 18, 2001   (GB) ................... 0125035.6

(51) Int. Cl.
B01J 8/02      (2006.01)
B01J 19/24     (2006.01)
F28D 9/00      (2006.01)
C01B 3/38      (2006.01)

(52) U.S. Cl. .................. 422/190; 422/211; 422/222; 48/127.5; 48/127.7; 48/127.9

(58) Field of Classification Search ................ 422/211, 422/222, 190, 177, 174; 518/704; 48/127.9, 48/127.7, 127.5
See application file for complete search history.

(56) References Cited

U.S. PATENT DOCUMENTS

| 1,662,870 A | | 3/1928 | Stancliffe |
| 4,214,867 A | | 7/1980 | Hunter ........................ 432/29 |
| 5,328,359 A | * | 7/1994 | Retallick ..................... 431/326 |
| 5,342,588 A | * | 8/1994 | Humpolik .................... 422/311 |
| 5,534,328 A | | 7/1996 | Ashmead ..................... 428/166 |

(Continued)

FOREIGN PATENT DOCUMENTS

DE          3926466          2/1991

(Continued)

Primary Examiner—N. Bhat
(74) Attorney, Agent, or Firm—William H. Holt

(57) ABSTRACT

A catalytic reactor comprises a plurality of sheets defining flow channels between then. Within each flow channel is a foil of corrugated material whose surfaces are coated with catalytic material. The flow channels extend in transverse dire options, but the foils are shaped to cause the gas in those channels to flow at least partly in counter current to the gas flowing in the other channels. The reactor incorporates header chambers to supply gas mixtures to the flow channels, each header being in the form of a cap attached to the outside of the back and covering a face of the stack. Hence different gas mixtures are supplied to the different channels which may be at different pressures, and the corresponding chemical reactions are also different, and heat is transferred through the sheets separating the adjacent channels. When the catalyst in one set of flow channels becomes spent, it can be replaced by removing a header.

6 Claims, 1 Drawing Sheet

U.S. PATENT DOCUMENTS

| | | | |
|---|---|---|---|
| 5,672,629 A * | 9/1997 | Heil et al. | 518/704 |
| 5,811,062 A | 9/1998 | Wegeng | 422/129 |
| 6,200,536 B1 | 3/2001 | Tonkovich | 422/177 |
| 6,284,217 B1 | 9/2001 | Wang | 423/651 |
| 6,440,895 B1 | 8/2002 | Tonkovich | 502/439 |
| 6,451,864 B1 | 9/2002 | Wang | 518/715 |
| 6,488,838 B1 | 12/2002 | Tonkovich | 208/108 |
| 2003/0105172 A1 * | 6/2003 | Bowe et al. | 518/728 |
| 2004/0237303 A1 * | 12/2004 | Maude | 29/890 |
| 2005/0013769 A1 * | 1/2005 | Bowe et al. | 423/652 |
| 2005/0234138 A1 * | 10/2005 | Bowe | 518/726 |

FOREIGN PATENT DOCUMENTS

| | | | |
|---|---|---|---|
| EP | 0212878 | | 3/1987 |
| EP | 0885 653 | * | 6/1988 |
| EP | 0292245 | | 11/1988 |
| EP | 0416710 | | 3/1991 |
| EP | 0430184 | | 6/1991 |
| EP | 0 571 056 | * | 5/1993 |
| EP | 0 724 069 | * | 7/1996 |
| EP | 0885653 | | 12/1998 |
| EP | 1132699 | | 9/2001 |
| GB | 1490977 | | 11/1977 |
| GB | 1 5 31 134 | * | 11/1978 |
| GB | 1531134 | | 11/1978 |
| GB | 1 546 097 | * | 5/1979 |
| GB | 1546097 | | 5/1979 |
| WO | 98/38147 | | 9/1998 |
| WO | 01/10773 | | 2/2001 |
| WO | 01/12312 | | 2/2001 |
| WO | 01/12323 | | 2/2001 |
| WO | 01/12753 | | 2/2001 |
| WO | WO 01/51194 | * | 7/2001 |
| WO | 02/064248 | | 8/2002 |
| WO | 02/066371 | | 8/2002 |
| WO | WO 03/0033132 | * | 4/2003 |

* cited by examiner

CATALYTIC REACTOR

This invention relates to a catalytic reactor suitable for use in performing gas phase reactions, and particularly but not exclusively for performing highly exothermic and endothermic reactions, and also to a chemical process using the catalytic reactor.

The use of catalytic material supported on a metal substrate is well known. For example GB 1 490 977 describes a catalyst comprising an aluminum-bearing ferritic alloy substrate, coated with a layer of a refractory oxide such as alumina, titania or zirconia, and then with a catalytic platinum-group metal. As described in GB 1 531 134 and GB 1 546 097, a catalyst body may comprise substantially flat sheets and corrugated sheets of such material arranged alternately so as to define channels through the body, either several such sheets arranged in a stack, or two such sheets wound together to form a coil. In these examples both the flat sheets and the corrugated sheets have small-scale corrugations superimposed upon them to help in the formation of the coating. Such catalyst bodies are described as being suitable for use in treating exhaust gas from vehicles. In this context heat transfer between one channel and an adjacent channel is not a consideration, as all the channels carry the same gases at the same pressures. EP 0 885 653 A (Friedrich et al.) describes a compact heat exchanger for catalytic reactions in which flow channels are defined by a single long sheet of metal folded into a concertina, with corrugated foils located between successive plates of the concertina; the corrugated foils are catalyst supports and enhance heat transfer between the channels, and in one example the gases on one side of the sheet undergo an exothermic reaction while those on the other side undergo an endothermic reaction.

According to the present invention there is provided a catalytic reactor comprising a plurality of metal sheets arranged as a stack and bonded together, the stack defining first flow channels between adjacent sheets, alternating with second flow channels between adjacent sheets, so as to ensure good thermal contact between fluids in the first and the second flow channels, the channels extending in transverse directions, fluid-permeable catalyst layers being provided within the second flow channels shaped to define flow paths that are at least partly parallel to the direction of the first flow channels, headers to supply respective fluids to the flow channels, each first header comprising a chamber attached to the outside of the stack and communicating with a plurality of first flow channels, and each second header comprising a chamber attached to the outside of the stack and communicating with a plurality of second flow channels, and such that after removal of a header the catalyst layers in the corresponding flow channels are removable.

The fluids in the channels may be gases or gas mixtures, and may also comprise droplets of liquid as an aerosol. Where a desired reaction between gases in the second flow channels is exothermic, a heat transfer liquid (rather than a gas) may be passed through the first flow channels.

Preferably the catalyst layers comprise fluid-permeable metal heat transfer layers with a catalyst coating. Similar metal heat-transfer layers are preferably also provided in the first gas flow channels, although in this case the gas flow direction is straight through the channel. This improves heat transfer. In each case the metal heat-transfer layer may comprise a non-planar metallic foil, or a metallic foam, mesh, fibre mat, honeycomb, or a similar structure combining ceramic and metal, for example; it must be highly permeable to the flow in the desired direction. Typically a corrugated foil is suitable.

To ensure the required good thermal contact, both the first and the second flow channels are preferably less than 5 mm deep in the direction normal to the surface of the sheet. More preferably both the first and the second flow channels are less than 3 mm wide in that direction.

Preferably the sheets are flat, with grooves machined or etched across their surfaces to define the flow channels. The reactor might therefore comprise a stack of such flat plates sufficiently thick to withstand the necessary pressure difference, the grooves in adjacent plates following different paths. The grooves may be for example 20 mm wide, this width being determined by the pressure difference to which the sheet is exposed, each accommodating one or more corrugated foil of material coated with catalytic material. Bonding the plates together, for example by diffusion bonding, ensures that the flow channels are gas tight.

Removal of a header exposes the open ends of the corresponding flow channels, so each catalyst layer can be removed simply by sliding it out of the flow channel through the open end.

In one use of the catalytic reactor, the gas mixture supplied to each channel is different from the gas mixture supplied to the adjacent channels, and the corresponding chemical reactions are also different. One of the reactions may be endothermic while the other reaction is exothermic. In that case heat is transferred through the wall of the sheet separating the adjacent channels, from the exothermic reaction to the endothermic reaction.

This reactor is particularly suitable for performing steam reforming of a hydrocarbon (which is an endothermic reaction, generating hydrogen and carbon monoxide), and the alternate channels might contain a methane/air mixture so that the exothermic oxidation reaction provides the necessary heat for the endothermic reforming reaction. For the oxidation reaction several different catalysts may be used, for example palladium, platinum or copper on a ceramic support; for example copper or platinum on an alumina support stabilised with lanthanum, cerium or barium, or palladium on zirconia, palladium on a metal hexaaluminate such as magnesium, calcium, strontium, barium or potassium hexaaluminate. For the reforming reaction also several different catalysts may be used, for example nickel, platinum, palladium, ruthenium or rhodium, which may be used on ceramic coatings; the preferred catalyst for the reforming reaction is rhodium or platinum on alumina or stabilised alumina. The oxidation reaction may be carried out at substantially atmospheric pressure, while the reforming reaction may be carried out at elevated pressure, for example up to 2 MPa (20 atmospheres), more typically in the range 0 to 200 kPa above atmospheric pressure.

It will be appreciated that the materials of which the reactor are made may be subjected to a severely corrosive atmosphere in use, for example the temperature may be as high as 900° C., although more typically around 850° C. The reactor may be made of a metal such as an aluminum-bearing ferritic steel, in particular of the type known as Fecralloy (trade mark) which is iron with up to 20% chromium, 0.5–12% aluminum, and 0.1–3% yttrium. For example it might comprise iron with 15% chromium, 4% aluminum, and 0.3% yttrium. When this metal is heated in air it forms an adherent oxide coating of alumina which protects the alloy against further oxidation; this oxide layer also protects the alloy against corrosion under conditions that prevail within for example a methane oxidation reactor or a steam/methane reforming reactor. Where this metal is used as a catalyst substrate, and is coated with a ceramic layer into which a catalyst material is incorporated, the alumina oxide layer on the metal is believed to bind with the ceramic coating, so ensuring the catalytic material adheres to the metal substrate.

A problem with any catalytic reactor is that the catalyst may become less active, and hence need to be replaced. Since the reactors are designed to be suitable for use at high temperatures and pressures the plates are desirably bonded together by a process such as diffusion bonding (which ensures gas-tight sealing), but it would be desirable to be able to reuse the bulk of the structure while being able to replace the catalysts. Furthermore co-current or counter-current flow of the two gas streams is desirable, rather than transverse flow, to achieve a satisfactory temperature distribution; the gas-permeable catalyst structures in the second flow channels achieve this.

For some purposes the catalyst metal might instead be deposited directly onto the adherent oxide coating of the metal (without any ceramic layer).

Especially if the reactor is to be used for an endothermic reaction, it may be desirable to raise the temperature of the reactor to a desired operating temperature by direct electrical heating, passing electric current through the sheets that form the reactor. This would typically only be done initially, the heat subsequently being provided by an exothermic reaction carried out in the second gas flow channels or by hot gases (for example exhaust gases from an external combustion process such as a laminar flow burner).

The invention will now be further and more particularly described, by way of example only, and with reference to the accompanying drawings in which:

Figure 1:
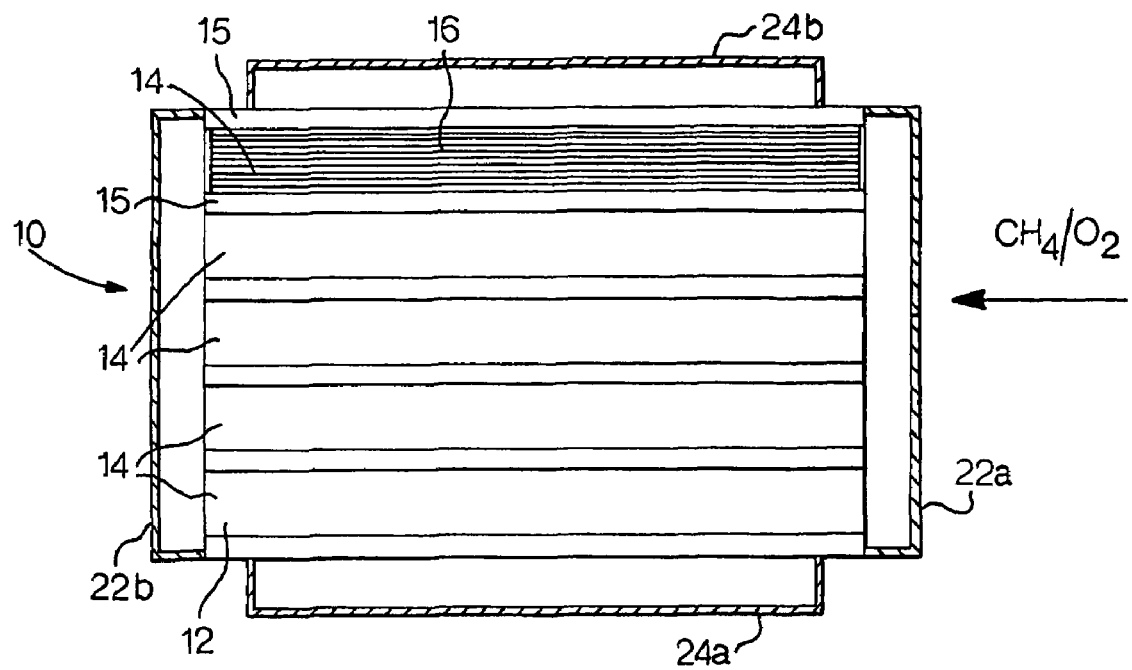
FIG. 1 shows a cross sectional view of a reactor showing one type of flow path.

Reactors of the invention may be used in a chemical process for converting methane to longer chain hydrocarbons. The first stage involves steam/methane reforming, that is to say the reaction:

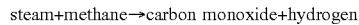
steam+methane→carbon monoxide+hydrogen

This reaction is endothermic, and may be catalysed by a rhodium catalyst in a first gas flow channel. The heat required to cause this reaction may be provided by combustion of methane, that is to say:

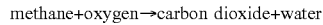
methane+oxygen→carbon dioxide+water which is an exothermic reaction, and may be catalysed by a palladium catalyst in an adjacent second gas flow channel. Both these reactions may take place at atmospheric pressure, although alternatively the reforming reaction might take place at an elevated pressure. The heat generated by the combustion reaction would be conducted through the metal sheet separating the adjacent channels.

The gas mixture produced by the steam/methane reforming can then be used to perform a Fischer-Tropsch synthesis, that is to say:

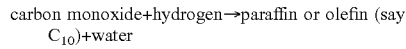
carbon monoxide+hydrogen→paraffin or olefin (say $C_{10}$)+water which is an exothermic reaction, occurring at an elevated temperature, typically between 200 and 350° C., for example 280° C., and an elevated pressure typically between 2 MPa and 4 MPa, for example 2.5 MPa, in the presence of a catalyst such as iron, cobalt or fused magnetite, with a potassium or ruthenium promoter. The exact nature of the organic compounds formed by the reaction depends on the pressure, the temperature and the catalyst, as well as the ratio of carbon monoxide to hydrogen. The heat given out by this synthesis reaction may be used to provide at least part of the heat required by the steam/methane reforming reaction, for example a heat transfer fluid such as water, helium or Dowtherm A (trade mark of Dow Chemical) may be used to transfer the heat from a reactor in which the Fischer-Tropsch synthesis is occurring, the heat being used to preheat at least one of the gas streams supplied to the reforming reactor.

For example, in the reforming step, a feed gas that consists primarily of methane with a small percentage (say 10%) of ethane and propane is heated to about 400° C., mixed with a stream of steam that is also at about 400° C. and is then supplied to a catalytic reactor. Both streams may be at atmospheric pressure, or for example at a pressure of say 100 kPa above atmospheric. The flows are preferably such that the steam: methane molar ratio is between 1:1 and 2:1. The first part of the reactor is a pre-reformer with a nickel methanation catalyst at 400° C., in which the higher alkanes react with the steam to form methane (and carbon monoxide); this pre-reformer is not required if the feed gas contains substantially no higher alkanes. The second part of the reactor is a reformer with a platinum/rhodium catalyst, in which the methane and steam react to form carbon monoxide and hydrogen. This reaction may be performed at 850° C. The heat for the endothermic reactions may be provided by combustion of methane over a palladium or platinum catalyst within adjacent gas flow channels, or alternatively from exhaust gases from an external combustion unit such as a laminar flow burner, the gases from the burner flowing in counter-current to the gas flow through the reformer; this can enable the reacting gases in the reformer to reach a final temperature of as much as 1000° C. Where catalytic combustion is used, the catalyst may incorporate a metal hexaaluminate (such as magnesium hexaaluminate) as the substrate, but a preferred catalyst is platinum and palladium (10% weight) on γ-alumina. The methane/oxygen mixture may be supplied in stages along the reactor, to ensure combustion occurs throughout its length.

The hot mixture of carbon monoxide and hydrogen emerging from the reformer may be used to provide heat to the steam and to the feed gas. The hydrogen may itself be a desired product, for example for use in a fuel cell. Alternatively the gas mixture may then be further processed, for example being compressed and supplied to a catalytic reactor in which the gases react, undergoing Fischer-Tropsch synthesis to form a range of hydrocarbons such as paraffins. The overall result of the processes is that methane is converted to higher molecular weight hydrocarbons which are typically liquids at ambient temperatures. The desired hydrocarbons can therefore be separated from the remaining gases by cooling, so the liquids condense. The processes may be used at an oil or gas well to convert methane gas into a liquid hydrocarbon which is easier to transport.

Figure 2:
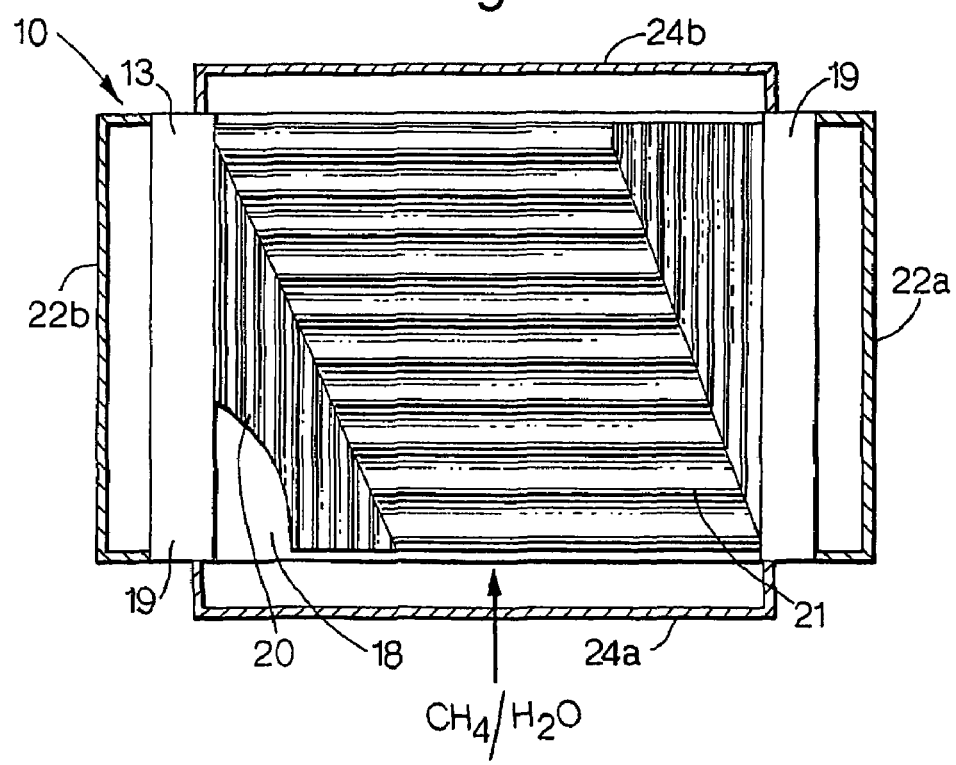
FIG. 2 shows a cross sectional view of the reactor of FIG. 1, showing the other type of flow path.

Referring now to the figures, a reactor 10 (suitable for example for steam/methane reforming) comprises a stack of plates 12 and 13 arranged alternately, each of Fecralloy steel, each rectangular 500 mm long and 325 mm wide and 3 mm thick. As shown in FIG. 1, grooves 14 of width 20 mm and depth 2.5 mm are machined across the upper surface of each plate 12, extending the entire length of the plate 12, separated by lands 15 of width 3 mm (for simplicity only five such grooves 14 and six such lands 15 are shown in FIG. 1). A carrier foil 16 of Fecralloy steel 50 µm thick coated with a ceramic coating containing a catalyst material, and with corrugations 2.5 mm high, can be slid into each such groove 14 (only one is shown). As shown in FIG. 2 a single groove 18 of width 480 mm and of depth 2.5 mm is machined across the upper surface of each plate 13, leaving a land 19 at each end. A stack of such plates 12 and 13 is assembled, and is covered with a flat top plate of Fecralloy steel; the stack is then compressed and diffusion bonded together.

The corrugated foils 16 are then inserted. Corrugated foils 20 whose corrugations are also 2.5 mm high are slid into the slots defined by the large grooves 18; these foils 20 define dog-leg shaped corrugations, with a straight central section 21 parallel to the longitudinal axis of the plate 13. Headers 22 are then attached to the end faces of the assembled stack, and headers 24 attached to the side faces of the stack. Thus the gas flow channels are defined by the grooves 14 and by the grooves 18, and the flow pattern within the grooves 18 is constrained by the corrugated foils 20.

The steam/methane mixture is supplied at elevated pressure to the header 24a, and the resulting mixture of hydrogen and carbon monoxide emerges through the header 24b having flowed along the dog-leg paths defined by the corrugations on the foils 20. Methane/air mixture at atmospheric pressure is supplied through the header 22a, so exhaust gas from the combustion process emerges through the header 22b. Hence the gas flows are at least partially counter-current, so that the hottest region in the combustion channels, which is near the inlet to those channels, is closest to the outlet for the steam/methane reforming reaction.

The headers 22 and 24 each comprise a simple rectangular cap sealed around its periphery to the outside of the stack so as to cover one face of the stack. They may be welded onto the outside of the stack. Alternatively, if neither of the gas flows are at elevated pressures, it may be adequate to clamp the header chambers 22 and 24 onto the outside of the stack. In either case it will be appreciated that after a period of use, if the catalyst in either or both of the channels has become spent, then the headers 22 and/or 24 may be removed or cut off and the corresponding catalyst-carrying foils 16 and/or 20 removed and replaced. The headers 22 and 24 can then be re-attached. The headers 24 may also incorporate baffles to inhibit gas flow into or from the parts of the channels 18 at which the corrugations 21 in the foil 20 are parallel to the longitudinal axis of the plate 13.

It will be understood that the type of ceramic deposited on the corrugated foils 16 and 20 in the two gas flow channels may be different, and that the catalyst materials may differ also. For example the ceramic might comprise alumina in one of the gas-flow channels, and zirconia in the other gas flow channels. The reactor 10 formed from the plates 12 and 13 might also be suitable for performing Fischer-Tropsch synthesis. Because the plates 12 and 13 forming the stack are bonded together the gas flow channels are gas tight (apart from communication with headers 22 or 24), and the dimensions of the plates 12 and grooves 14 are such that pressures in the other gas flow channels 18 may be considerably higher. Furthermore the pitch or pattern of the corrugated foils 16 and 20 may vary along a reactor channel 14, 18 to adjust catalytic activity, and hence provide for control over the temperatures or reaction rates at different points in the reactor 10. The corrugated foils 16 may also be shaped, for example with perforations, to promote mixing of the fluid within the channels 14. Furthermore parts of the foils 16 and 20 may have different catalyst loading, or may be devoid of catalyst.

In a modification to the reactor 10, the foils 16 and 20 are again of Fecralloy material, but the catalyst material is deposited directly onto the oxide layer of the Fecralloy.

In an alternative mode of use, the combustion takes place in an external burner (such as a laminar flow burner), the very hot exhaust gases at about 900 or 1000° C. being passed through the flow channels 14 of the reactor 10 in place of the methane/air mixture, and so at least partly in counter-current to the methane/steam flow. In this case it is not necessary to provide the foils in those channels with ceramic coating or catalyst, but the foils enhance heat transfer between the second gas flow channel carrying the hot exhaust gas and the reactants in the pre-reformer and reformer channels, by transferring heat to the separating plates 12, 13.

In a further modification, the plates 12, 13 that resist the pressure difference between the flow channels are of a metal such as 304 or 310 stainless steel, titanium, or Incalloy 800 HT that can withstand the high temperatures and the pressures and which can be readily diffusion bonded, while the foils 16 and 20 may be of Fecralloy steel if a ceramic coating (as a catalyst substrate) is required.

In the combustion channels of the catalytic reactor 14, if catalytic combustion is used to generate the heat (as indicated), the combustion catalyst may itself be coated with a thin porous inert ceramic layer, so as to restrict the contact of the gas mixture with the catalyst and so restrict the reaction rate particularly at the start of the channel.

As mentioned earlier, electrical heating by passing an electric current directly through the plates forming the reactor may be used initially to raise the temperature of the catalytic reactor to say 400° C. before supplying gases, to ensure a catalytic combustion occurs. Such electrical heating may also be used during operation to adjust the reactor temperature. Electrical heating may also be used in the vicinity of the outlet from the reactor to ensure that a temperature of say 900° C. is reached by the gases undergoing the reforming reaction.

The invention claimed is:

1. A catalytic reactor comprising a plurality of metal sheets arranged as a stack and bonded together, said stack defining first flow channels between adjacent sheets, alternating with second flow channels between adjacent sheets, for ensuring good thermal contact between fluids in said first and second flow channels, the channels extending in transverse directions, fluid permeable catalyst layers being provided within said second flow channels shaped to define flow paths that are at least partly parallel to the direction of said first flow channels, said catalyst layers being shaped for defining dogleg shaped corrugations having a straight central section parallel to the direction of said first flow channels, first and second headers for supplying respective fluids to said first and second flow channels, each first and second header comprising a chamber attached to the outside of said stack and communicating with a plurality of said first flow channels, and each second header comprising a chamber attached to the outside of said stack and communicating with a plurality of said second flow channels, and such that after removal of one of said headers the catalyst layers in the corresponding flow channels are removable therefrom.

2. A catalytic reactor as claimed in claim 1 wherein said catalyst layers comprise fluid permeable metal heat transfer layers having a catalyst coating thereon.

3. A catalytic reactor as claimed in claim 2 wherein each catalyst layer comprises a corrugated metal foil having a ceramic coating comprising a catalyst.

4. A catalytic reactor as claimed in claim 1 wherein said sheets are flat, with grooves extending across their surfaces for defining said flow channels, said plates being sufficiently thick and said grooves being sufficiently narrow for the reactor to withstand the necessary pressure difference during operation, and said plates being bonded together.

5. A catalytic reactor as claimed in claim 1 wherein each catalyst layer comprises a corrugated metal foil with a ceramic coating comprising a catalyst, said foils being of an aluminum-bearing ferritic steel.

6. A plant for processing methane to produce longer chain hydrocarbons, said plant comprising a first catalytic reactor for performing steam/methane reforming and a second catalytic reactor for performing Fisher-Tropsch synthesis, each catalytic reactor being a catalytic reactor as claimed in claim 1; means for transferring the products of first catalytic reactor to said second catalytic reactor, said means for transferring incorporating at least one heat exchanger for removing heat from said products and at least one compression means for increasing the pressure of said products; and means for condensing liquid components of the fluid mixture resulting from said Fisher-Tropsch synthesis.

* * * * *